US006780806B1

(12) United States Patent
Yang et al.

(10) Patent No.: US 6,780,806 B1
(45) Date of Patent: Aug. 24, 2004

(54) LITHIUM-BASED ZEOLITES CONTAINING SILVER AND COPPER AND USE THEREOF FOR SELECTIVE ABSORPTION

(75) Inventors: Ralph T. Yang, Ann Arbor, MI (US); Nick D. Hutson, Augusta, GA (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/869,623

(22) PCT Filed: Dec. 13, 1999

(86) PCT No.: PCT/US99/29666

§ 371 (c)(1),
(2), (4) Date: Jun. 28, 2001

(87) PCT Pub. No.: WO00/40332

PCT Pub. Date: Jul. 13, 2000

Related U.S. Application Data

(60) Provisional application No. 60/114,371, filed on Dec. 30, 1998.

(51) Int. Cl.[7] .................................................. B01J 29/06
(52) U.S. Cl. ............................ 502/79; 502/64; 502/75; 502/60
(58) Field of Search .............................. 502/60, 64, 75, 502/79; 95/96, 116, 130, 902

(56) References Cited

U.S. PATENT DOCUMENTS

| 2,882,243 A | 4/1959 | Milton ........................ 252/455 |
| 2,882,244 A | 4/1959 | Milton ........................ 252/455 |
| 3,130,007 A | 4/1964 | Breck ............................ 23/113 |
| 3,626,020 A | 12/1971 | Neuzil ........................ 260/674 |
| 3,992,471 A | 11/1976 | Priegnitz ............. 260/681.5 R |
| 4,019,880 A | 4/1977 | Rabo et al. ...................... 55/68 |
| 4,120,700 A | 10/1978 | Morimoto .................... 148/1.5 |
| 4,147,573 A | 4/1979 | Morimoto .................... 148/175 |
| 4,217,855 A | 8/1980 | Takagi ........................ 118/719 |
| 4,481,018 A | 11/1984 | Coe et al. ........................ 55/68 |
| 4,557,736 A | 12/1985 | Sircar et al. ..................... 55/62 |
| 4,859,217 A | 8/1989 | Chao .............................. 55/68 |
| 5,074,892 A | 12/1991 | Leavitt ........................... 55/25 |
| 5,174,979 A | 12/1992 | Chao et al. ................... 423/715 |
| 5,258,058 A | 11/1993 | Coe et al. ...................... 95/95 |
| 5,268,023 A | 12/1993 | Kirner ........................... 95/103 |
| 5,290,732 A | 3/1994 | Kumar et al. ................ 437/183 |
| 5,413,625 A | 5/1995 | Chao et al. .................... 95/103 |
| 5,417,957 A | 5/1995 | Coe et al. ..................... 423/700 |
| 5,464,467 A | 11/1995 | Fitch et al. ...................... 95/98 |
| 5,470,378 A | 11/1995 | Kandybin et al. ............. 95/100 |
| 5,488,020 A | 1/1996 | Diesen et al. .................. 502/60 |
| 5,551,257 A | 9/1996 | Jain ............................. 62/644 |
| 5,554,208 A | 9/1996 | Mullhaupt et al. .............. 95/96 |
| 5,932,509 A | 8/1999 | Balse et al. .................... 502/65 |
| 6,432,170 B1 * | 8/2002 | Chiang et al. .................. 95/96 |
| 2002/0144596 A1 * | 10/2002 | Dee et al. ....................... 95/96 |

FOREIGN PATENT DOCUMENTS

| EP | 0 893 157 A1 | 1/1999 | ............ B01J/20/18 |
| EP | 1 125 635 | * 8/2003 | |
| GB | 937750 | 9/1963 | |
| GB | 2 302 824 A | 5/1997 | ............ B01J/20/18 |
| JP | 59-64510 | 4/1984 | |
| JP | 10-95612 | 4/1998 | |
| JP | 10-128106 | 5/1998 | |

OTHER PUBLICATIONS

Hutson, N.D., Yang R.T., "Structural Effects on Adsorption of Atmospheric Gases in Mixed Li, Ag X Zeolite," AlChE Journal, Nov. 2000, pp. 2305–2317.*
Hutson, N.D. et al., "Mixed Cation Zeolites: LiAgX as a Superior Adsorbent for Air Separation," AlChe Journal, Apr. 1999, p. 724–734.*
R.T. Yang et al., "Zeolites Containing Mixed Cations for Air Separation by Weak Chemisoprtion–Assisted Adsorption," Ind. Eng Chem. Res, 1996, vol. 35, pp. 3093–3099.*
International Search Report dated Mar. 17, 2000 for PCT/US 99/29666.
"Olefin/Paraffin Separations by Adsorption: π– Complexation vs. Kinetic Separation" Salil U.
Rege, Joel Padin, and Ralph T. Yang, AIChE Journal, vol. 44., No. 4, pp: 799–809, Apr. 1998.
"Ab Initio Molecular Orbital Siudy of Adsorption of Oxygen, Nitrogen, and Ethylene on Silver—Zeolite and Silver Halides," N. Chen and R. T. Yang, Ind. Eng. Chem. Res., 35, pp. 4020–4027, 1996.
"New Sorbents for Olefin/Paraffin Separations by Adsorption via π–Complexation" R. T. Yang and E. S. Kikkinides, AIChE Journal, vol. 41, No. 3, pp. 509–517; Mar. 1995.
"Gas Separation and Purification by Polymeric Adsorbents: Flue Gas Desulfurization and $SO_2$ Recovery with Styrenic Polymers," E. S. Kikkinides and R. T. Yang, Ind. Eng. Chem Res., 32, pp. 2365–2372, 1993.
"Modifications of Resin–Type Adsorbents for Ethane/Ethylene Separation", Zhongbiao Wu, Sang–Sup Han, Soon–Haeng Cho, Jong–Nam Kim, ‡Kuck–Tack Chue, and Ralph T. Yang, Ind. Eng. Chem. Res, 36, pp. 2749–2756, 1997.
"Spontaneous Monolayer Dispersion of Oxides and Salts onto Surfaces of Supports: Applications to Heterogeneous Catalysis," You–Chang Xie and You–Qi Tang ,Advances in Catalysis, vol. 37, p. 1–43, 1990.

* cited by examiner

Primary Examiner—Tom Dunn
Assistant Examiner—Christina Ildebrando
(74) Attorney, Agent, or Firm—Dierker & Associates, P.C.

(57) ABSTRACT

The invention provides new methods for separating nitrogen from a mixture. The invention provides adsorbents specifically for accomplishing nitrogen separation. The adsorbents and separation methods are particularly useful for the selective adsorption of nitrogen from air. In one aspect, the adsorbent comprises an ion exchange zeolite X and preferably zeolite LSX (low silica zeolite X). The zeolite is most preferably a lithium-based zeolite. Further, the zeolite has exchangeable cationic sites, with silver cation or copper cation occupying at least some of the exchangeable cationic sites. The Ag/Cu exchanged zeolite is heat-treated under specific conditions as per the invention. The presence of the silver cation or copper cation at any of the sites will provide an improvement over the non-exchanged zeolite.

17 Claims, 10 Drawing Sheets

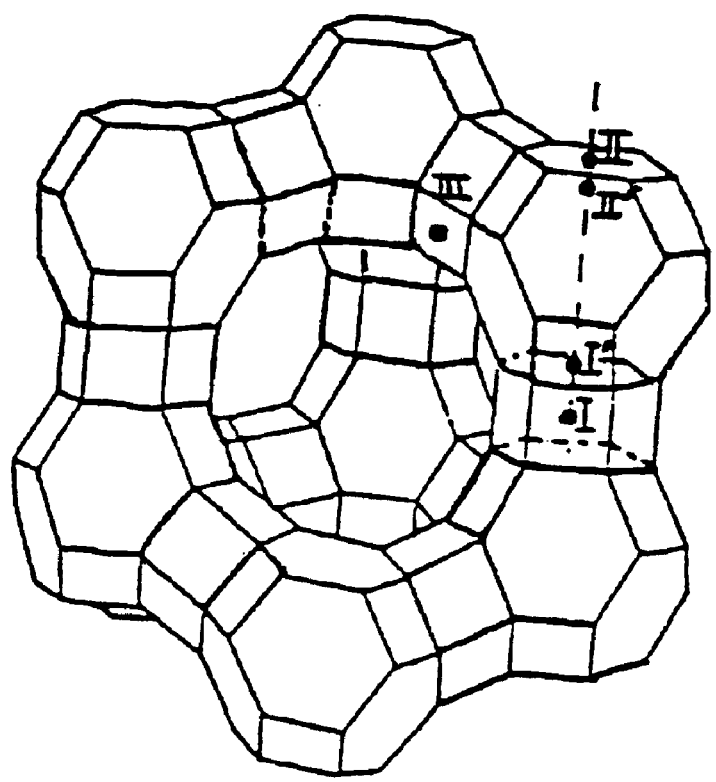
Figure 1. Unit cell of faujasite-type (X and Y) zeolites including cation sites.

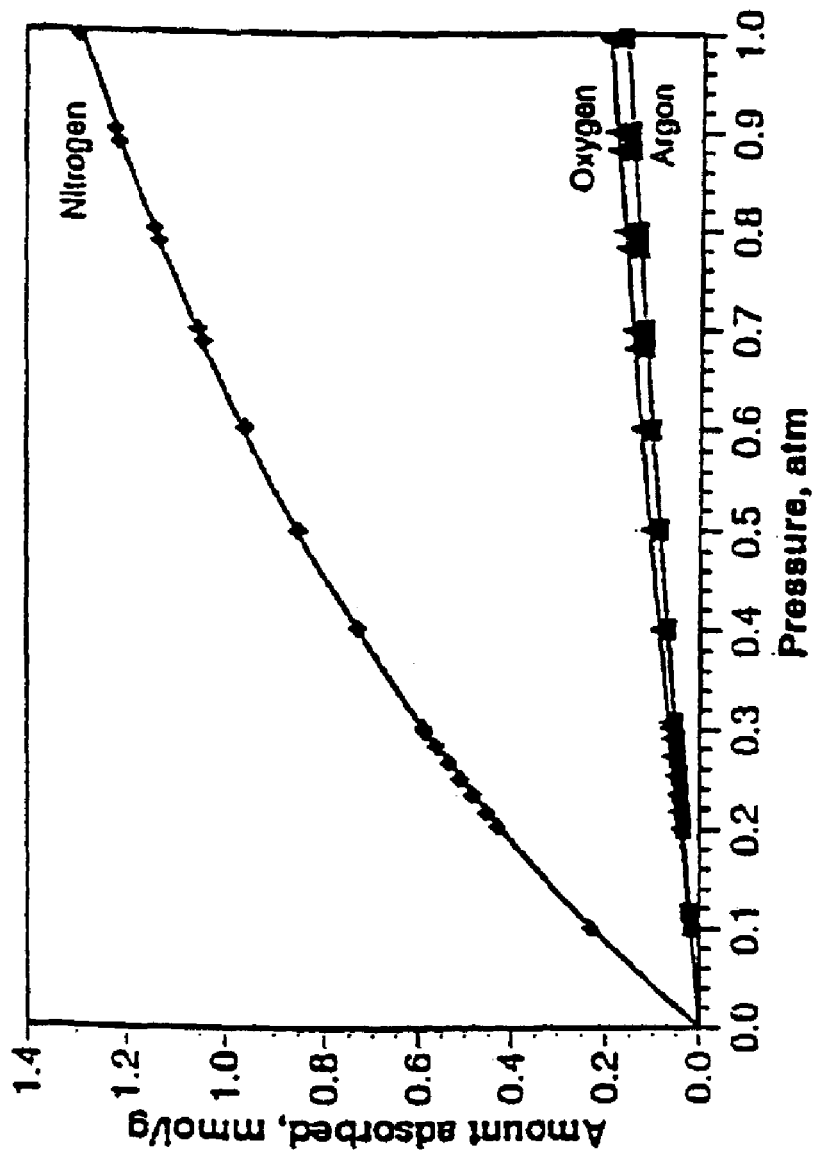
Figure 2. Adsorption isotherms for $N_2$, $O_2$ and Ar measured at 25°C for $Li_{94.5}Na_{1.5}$-X-1.0 dehydrated *in vacuo* at 350°C.

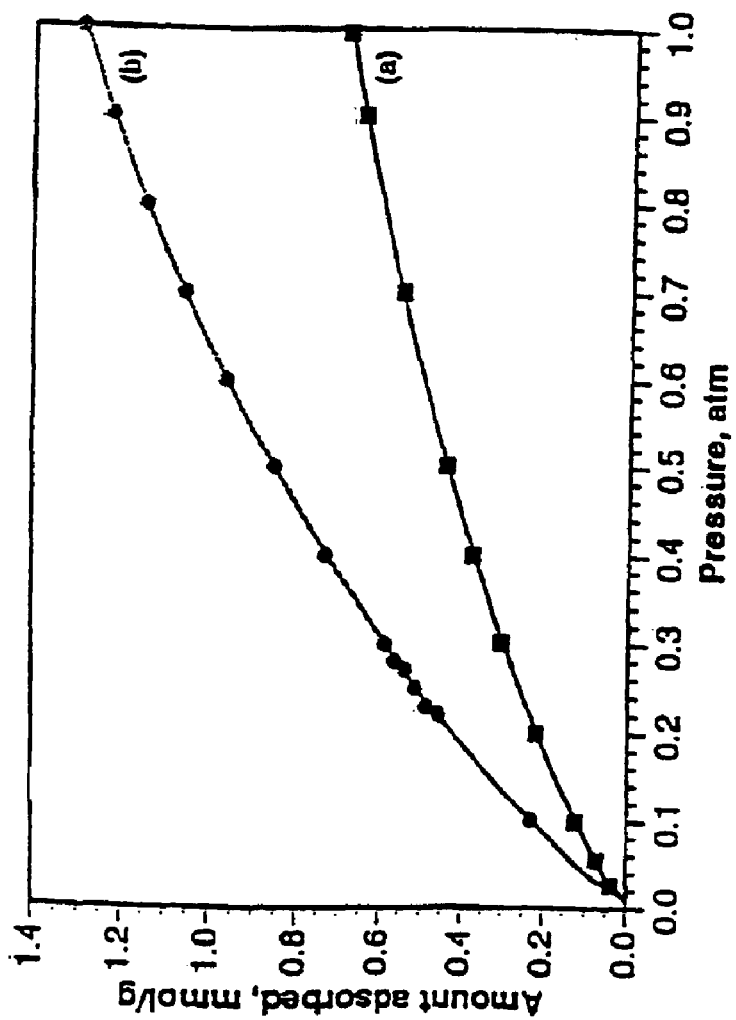
Figure 3. N$_2$ adsorption isotherms, measured at 25°C for (a) Li$_{77}$Na$_9$X-1.25) and (b) Li$_{94.5}$Na$_{1.5}$-X-1.0. Both materials were dehydrated *in vacuo* at 350°C.

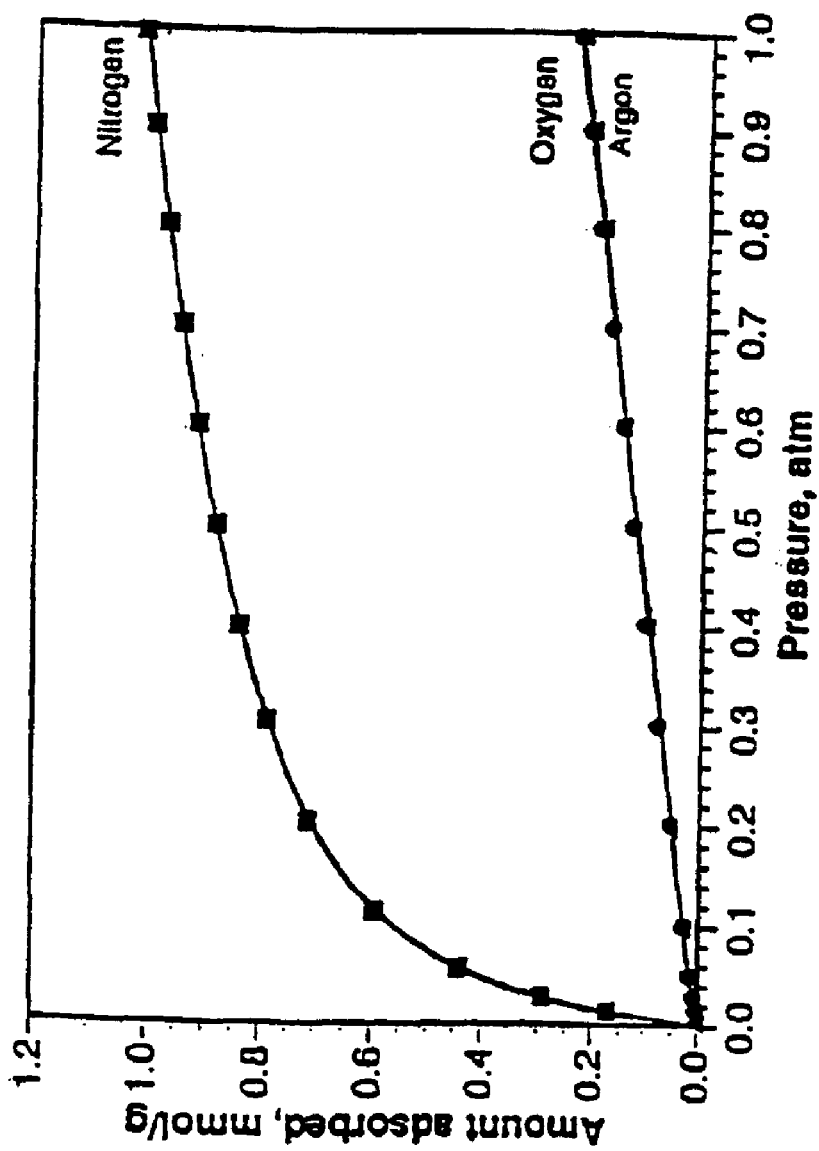
Figure 4. Adsorption isotherms measured at 25°C for $N_2$, $O_2$ and Ar on $Ag_{95.7}Na_{0.3}$-X-1.0 dehydrated *in vacuo* at 450°C.

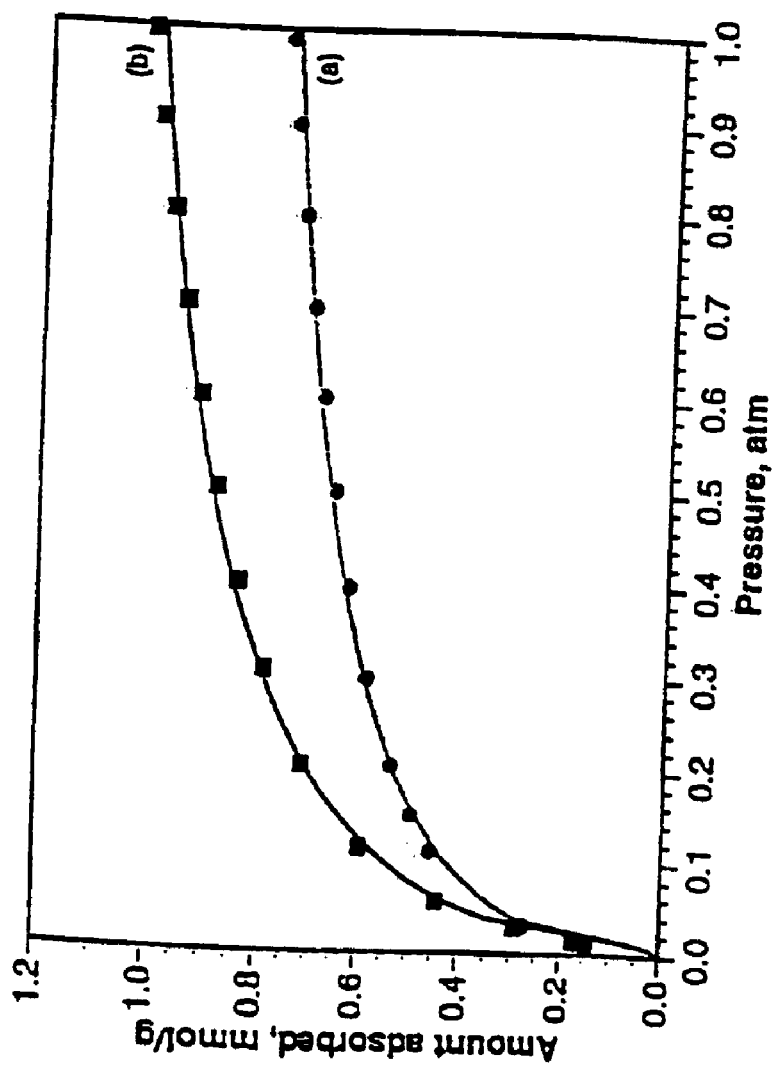
Figure 5. $N_2$ adsorption isotherms, measured at 25°C, for (a) $Ag_{85.7}Na_{0.3}$-X-1.25 and (b) $Li_{95.7}Na_{0.3}$-X-1.0. Both materials were dehydrated in vacuo at 450°C.

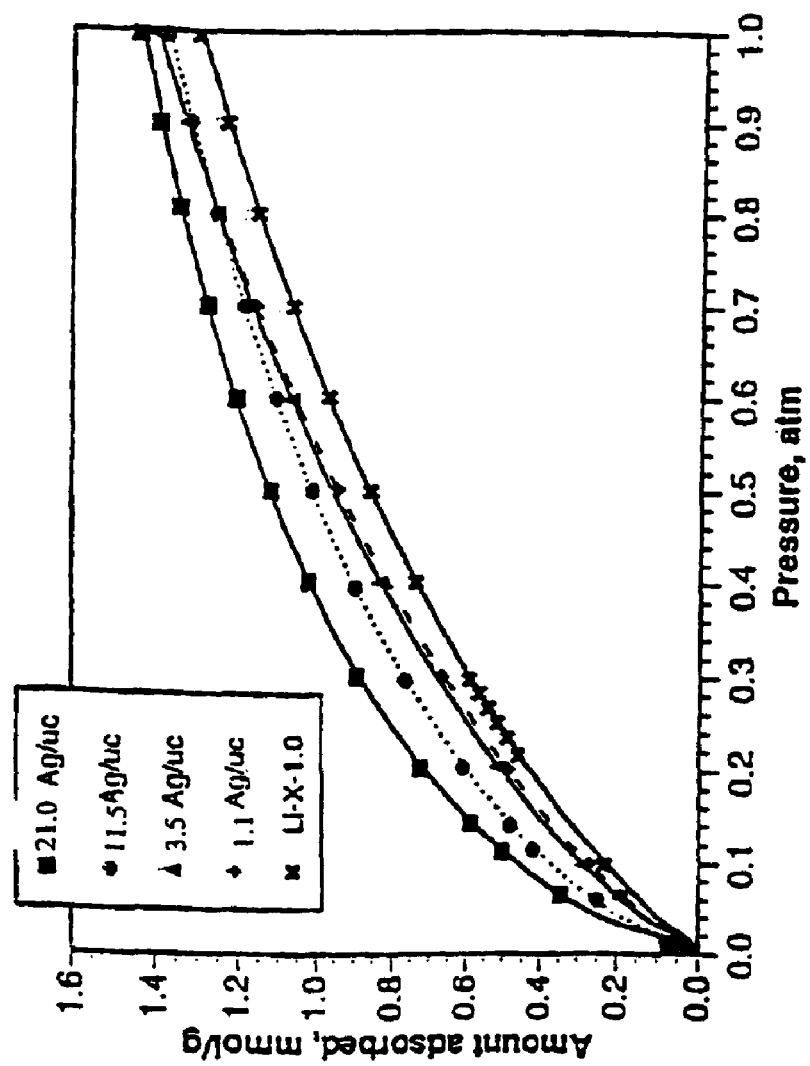
Figure 6. $N_2$ adsorption isotherm, measured at 25°C, for $(Li_xAg_y$-X-1.0 zeolites dehydrated *in vacuo* at 450°C. This shows the addition of increasing amounts of Ag results in a change in the general aspect of isotherm toward that of the fully $Ag^+$-exchanged material.

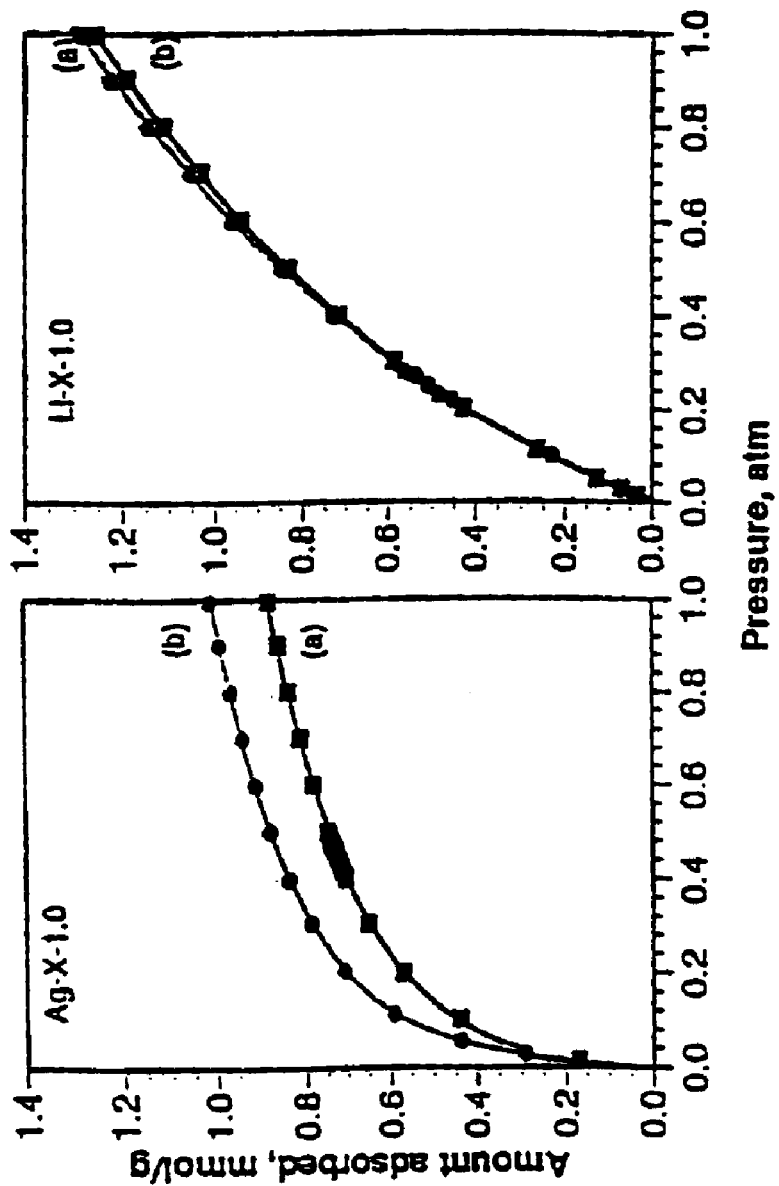
Figure 7. $N_2$ adsorption isotherm, measured at 25°C, for $Ag_{95.7}Na_{0.3}$-X-1.0 (left, Ag-X-1.0) and $Li_{94.5}Na_{1.5}$-X-1.0 (right, Li-X-1.0). The materials were dehydrated *in vacuo* at (a) 350°C and (b) 450°C.

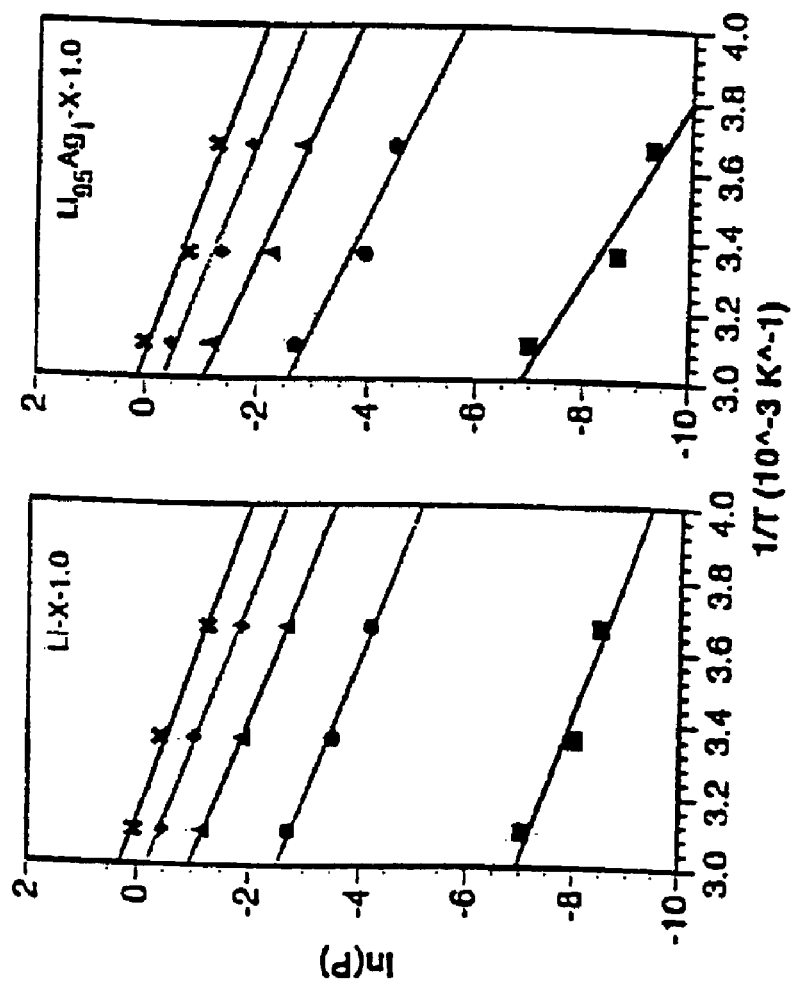
Figure 8. In (P) vs 1/T at different coverages for $Li_{94.5}Na_{1.5}$-X-1.0 (left, Li-X-1) and $Li_{94.2}Na_{0.7}Ag_{1.1}$-X-1.0 (right, $Li_{95}Ag_1$-X-1).

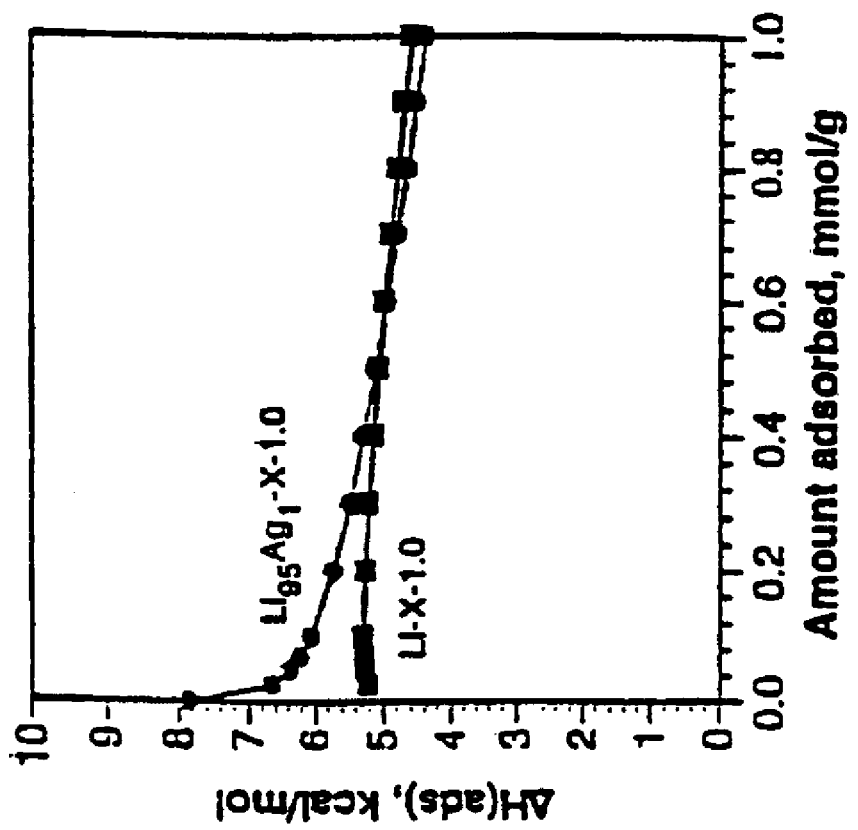
Figure 9. Isosteric heats of adsorption of $N_2$ for $Li_{94.5}Na_{1.5}$-X-1.0 (Li-X) and $Li_{94.2}Na_{0.7}Ag_{1.1}$-X-1.0 ($Li_{95}Ag_1$-X).

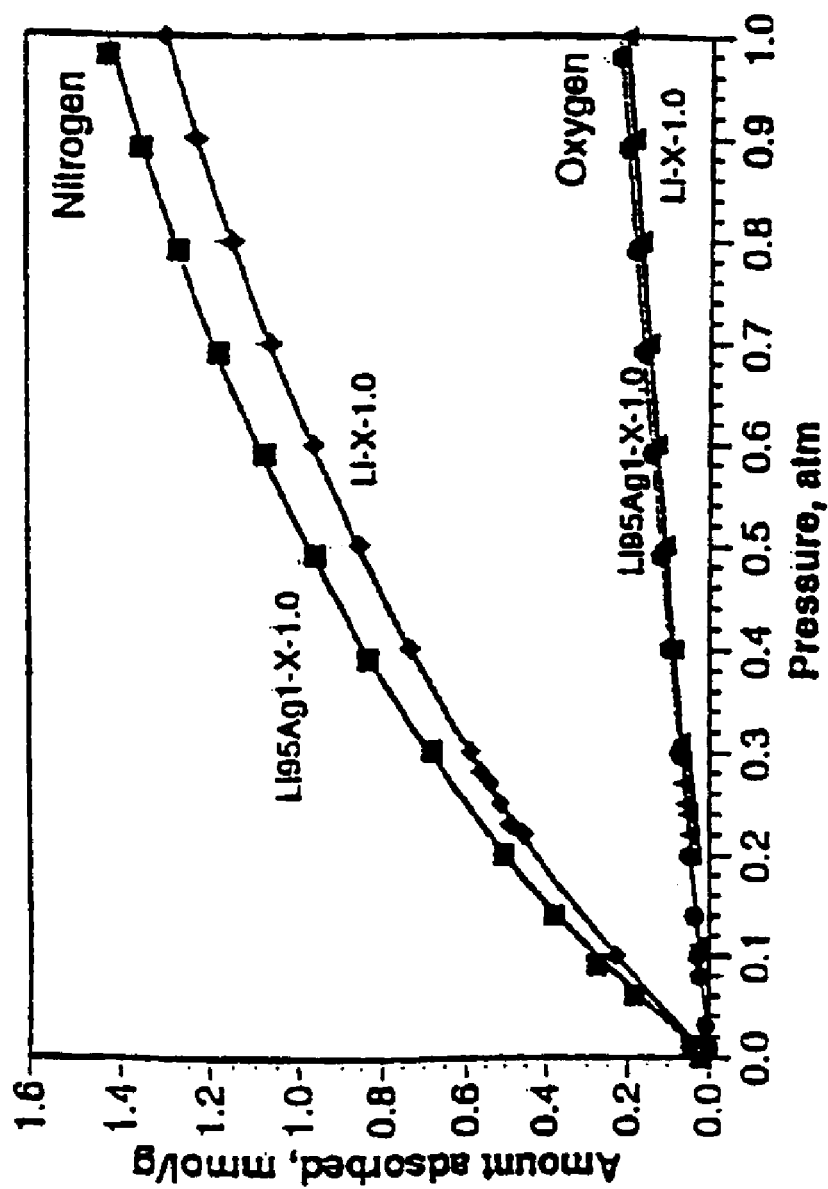
Figure 10. $N_2$ and $O_2$ isotherms for $Li_{94.2}Na_{0.7}Ag_{1.1}$-X-1.0 ($Li_{95}Ag_1$-X) dehydrated *in vacuo* at 450°C and for $Li_{94.5}Na_{1.5}$-X-1.0 (Li-x) dehydrated *in vacuo* at 350°C. All isotherms were measured at 25°C.

LITHIUM-BASED ZEOLITES CONTAINING SILVER AND COPPER AND USE THEREOF FOR SELECTIVE ABSORPTION

This application claims benefit of Provisional Application 60/114,371, filed Dec. 30, 1998.

FIELD OF THE INVENTION

This invention relates to a process and adsorbents for selective adsorption of a gas component, and particularly, selective adsorption of nitrogen.

BACKGROUND OF THE INVENTION

The separation of air for the production of nitrogen and oxygen is a very important operation in the chemical processing industry. Historically, this separation has been done predominately by cryogenic distillation; though, as adsorption systems have become more efficient and new, more effective sorbents have been synthesized, separation by adsorption processes (e.g., pressure swing adsorption (PSA), and vacuum swing adsorption (VSA)) have become increasingly competitive and are already favorable for small-to-medium scale operations. Currently, approximately 20% of air separations are accomplished using adsorption technologies.

Since their introduction in the late 1950's, synthetic zeolites have been used in numerous applications such as catalysis, ion exchange, drying, and separation by selective adsorption. In the separation of air, zeolites of type A and X have typically been used. (See U.S. Pat. No. 5,551,257, Jain). The A and X type zeolites are composed of silica and alumina tetrahedra which are joined together to form the truncated octahedral or sodalite structure. These sodalite units are connected with tertiary units to form the structured zeolite unit cell. While the $SiO_2$ groups are electroneutral, the $AlO_2$ groups are not, and thus introduce a negative charge to the structure which is offset by the presence of a charge compensating, non-framework cation (e.g., $Na^+$, $Li^+$, $Ca^{2+}$). Type X zeolites contain between 77 and 96 Al per unit cell. The unit cell, including cation sites, for the X zeolite is shown in FIG. 1.

The extra-framework cations in the zeolite are largely responsible for the nitrogen selectivity of these materials. These zeolites adsorb nitrogen preferentially to oxygen (usually at a ratio of about 4:1) due primarily a to the interactions between the charge compensating cations of the zeolite and the quadruple moment of the adsorbing gas ($N_2$ or $O_2$). The quadruple moment of $N_2$ is approximately four times that of 02. Because the extra-framework cations so significantly influence the adsorption properties of the zeolites, numerous attempts have been made to optimize these properties by (1) increasing the number of cation sites (the cation exchange capacity, CEC) by creating zeolites with high aluminum content, and (2) by synthesizing zeolites containing various alkaline, alkaline earth, and combinations of these cations.

Low silica X-type zeolite (LSX) is known. This material is an aluminum saturated X-type zeolite with a silica-to-alumina ratio of 2.0 (or Si/Al=1.0). Commercial X-zeolite, which is typically available as the $Na^+$ form (known commercially as 13X), is not aluminum saturated and contains 86 aluminum atoms per unit cell, while the low silica X zeolite contains 96 aluminum atoms per unit cell.

$Li^+$ is among the strongest cations, with respect to its interaction with $N_2$, its use was greatly increased with two recent advances. First, it was found that $Li^+$ ion-exchange in X-type zeolite must exceed an approximate 70% threshold before the $Li^+$ has any affect on the adsorption properties of the material (U.S. Pat. No. 4,859,217, Chao). Second, a significant increase in the $N_2$ adsorption capacity was seen in $Li^+$ ion exchanged low silica X-type zeolites over that of the typical commercial zeolites (Si/Al=1.25). Because of these advances, Li—X (Si/Al=1.0) is now the best sorbent in industrial use for separation of air by adsorption processes (U.S. Pat. No. 5,268,023, Kirner; U.S. Pat. No. 5,554,208, Mullhaupt).

Sicar et al., U.S. Pat. No. 4,557,736 and Coe et al., U.S. Pat. No. 4,481,018 reported the use of a binary exchanged X-zeolite having lithium and calcium and/or lithium and strontium ions in a ratio of 5% to 50% calcium and/or strontium and 50% to 95% lithium. This zeolite provided for enhanced nitrogen adsorption over those of the Na—X, Li—X and Ca—X zeolites. They also reported the use of mixed ion-exchanged A and X zeolites with lithium and an alkaline earth metal (e.g., $Ca^{2+}$, $Sr^{2+}$). In this case the zeolite contained lithium and the alkaline earth cations in a mixture of 10% to 70% alkaline earth and 30% to 90% lithium. These mixed cation zeolites provide good adsorption capacity and good thermal stability. However, the cost of separation still remains high. Therefore, there remains the need for improved methods and adsorbents to effectively and economically separate nitrogen from a gaseous mixture.

SUMMARY OF THE INVENTION

The invention provides new methods for separating nitrogen from a mixture. The invention provides adsorbents specifically for accomplishing. nitrogen separation. The adsorbents and separation methods are particularly useful for the selective adsorption of nitrogen from air. In one aspect, the adsorbent comprises an ion exchange zeolite X and preferably zeolite LSX (low silica zeolite X). The zeolite is most preferably a lithium-based zeolite. Further, the zeolite has exchangeable cationic sites, with silver cation or copper cation occupying at least some of the exchangeable cationic sites. The presence of the silver cation or copper cation at any of the sites will provide an improvement over the non-exchanged zeolite. Therefore, the minimum amount of silver cation or copper cation is greater than zero. The inclusion of silver cation and/or copper cation at the exchangeable cationic sites provides such an improvement in strength of adsorption of nitrogen, that any amount is helpful. However, consideration is given to the strength of such adsorbent capacity when optimizing the amount, in view of subsequent desorption. Since $Ag^+$ and $Cu^+$ strongly hold nitrogen, it is desirable that the amount of such cation be up to about 20% of the exchangeable cationic sites. It is preferred that the silver or copper cation occupy about 10% of the exchangeable cationic sites. Such optimization leads to a good balance between strength of adsorption and facilitating subsequent desorption. Therefore, it is evident that not all of the ion exchangeable cationic sites of the zeolite will contain copper or silver and preferably less than half of such sites will be so exchanged.

Zeolites are known and have been used as adsorbents due to their selectivity. Crystalline zeolite Y, zeolite A, and zeolite X are examples and are described in U.S. Pat. Nos. 3,130,007; 2,882,243; 3,992,471; and 2,882,244; each of which is incorporated by reference in its entirety. Type 5A zeolite, and type 13X zeolite are described for nitrogen adsorption in U.S. Pat. No. 5,551,257, also incorporated herein by reference in its entirety. Low silica X zeolite (LSX) having Si/Al ratio less than or equal to 1.25, desirably less than or equal to 1.2, and preferably about 1, is described in U.S. Pat. No. 5,268,023. Each of the aforementioned patents is incorporated herein by reference in its entirety. Consistent with the features described in these patents, zeolite characteristics are also described in the reference book entitled "Gas Separation by Adsorption Processes" by R. T. Yang (1987 Butterworth Publishers). To the extent that zeolite characteristics are pertinent to the present invention, they will be described further hereinbelow.

In the practice of the invention, the important characteristic desired is imparted by the presence of silver and/or copper cation in a zeolite which has been previously exchanged to provide a lithium X zeolite or a lithium LSX zeolite. The desirable X zeolite has a silicon to aluminum ratio (Si/Al) of about 1 to about 1.3. The more desirable lithium LSX has the preferred silicon to aluminum ratio of 1.0. Therefore, the adsorbents of the invention are essentially silver or copper ion exchanged $Li^+$ zeolites. The presence of the silver cation or the presence of the copper cation in combination with the lithium cation provides the desired characteristic for improved nitrogen adsorption. However, the zeolite may also include minor amounts of other commonly found cations which occur in zeolite including, but not limited to besides lithium, potassium, sodium, rubidium, caesium, and mixtures thereof which are alkali metal cations; and alkaline earth metal cations beryllium, magnesium, calcium, strontium, barium, and mixtures thereof. The presence of a trivalent cation is also possible, however, such is not preferred in order to provide available sites for occupancy by the preferred silver, copper, and lithium.

In another aspect, the adsorbents of the invention are used in a method for separating nitrogen from a gaseous air mixture, by accomplishing adsorption at a first select pressure and temperature and then accomplishing release or desorption by changing at least one of the pressure and temperature. Preferential adsorption of nitrogen is preferably achieved by pressure swing adsorption. Conveniently, this may be carried out and is preferably carried out at about ambient room temperature conditions. Therefore, special temperature treatment is not required. In the pressure swing process, the preferred range for adsorption is about 1 to about 10 atmospheres, and the preferred range for desorption is about 0.2 atmospheres to about 1 atmosphere.

In the process for preparing the zeolites of the invention, first lithium zeolites are prepared by ion exchange using lithium chloride. Then these lithium-zeolites were used to prepare $Li_xAg_y$-zeolites and $Li_xCu_y$-zeolites. For convenience, these will be referred to as mixed cation zeolites containing lithium, and transition metal capable of a +1 valence state (targeted metal ion). The preparation of the $Li_xAg_y$-zeolites is exemplary and is accomplished by ion exchange of a Li-zeolite, prepared as described earlier, with a solution of silver nitrate. The copper ion exchange is accomplished in a comparable manner. Ion exchange of zeolite is easily accomplished by mixing the zeolite in an aqueous solution of metal salt. The metal of the salt is the metal to be exchanged into the cationic site. The concentration of the solution is varied according to the desired level of ion exchange. The ion exchanged zeolite is then removed by filtration from the aqueous solution and washed free of the soluble salts. The Cu-zeolites of the invention are prepared by ion exchanging with a copper salt solution preferably copper chloride or copper nitrate, followed by reduction of any copper +2 to copper +1.

After the incorporation of the targeted metal ion, the mixed cation material is dried at room temperature and atmospheric conditions. Dehydration in vacuo may follow later, and prior to use and/or analysis. Zeolites have a strong affinity for water; and some molecules are tenaciously held. The presence of water in the zeolite affects measurement. In the process of the present invention, specific conditions for heat treatment are used beyond the treatment required for mere dehydration. In the present invention, specific heat treatment is used to optimize performance of the mixed cation zeolite of the invention. The heat treatment, after ion exchange, of the mixed cation zeolite is above a minimum temperature of approximately 400° C. A temperature of 400° C. or greater is required in order to form crystal clusters of silver and/or copper. The upper limit to the heat treat temperature is 700° C.; and preferably is below 700° C., as this is determined to be the point at which destruction of the zeolite itself occurs. The heat treatment is able to be accomplished in air, in vacuum, in inert atmosphere such as argon, nitrogen, or in reducing atmosphere. Desirably, the heat treatment is in a non-oxidizing atmosphere such as in vacuo, in inert atmosphere, or reducing atmosphere. An air atmosphere is less desirable. The non-oxidizing atmosphere is selected to produce partially metallic clusters, and provide the cluster formation and character of the zeolite product described herein. Here inert means inert with respect to the metal ions, cluster formation and character of the zeolite. Thus, the atmosphere needs to be unreactive with the zeolite, and not interfere with formation of desired ion clusters. Treatment temperatures on the order of 20 to 30 minutes are thought to be a minimum. There is no real maximum to the duration of heat treatment time and such time has been extended to 5 hours without any difficulty. Typical heat treatment time varies from about 1 to about 4 hours; and more typically 1 to 2 hours.

The preferred lithium content of the zeolite is such that, of the available cationic sites, 70% or more and preferably 80% or more of such sites contain lithium. It is preferred that the proportion of cationic sites occupied by the silver and/or copper be up to about 10%, although up to about 20% is workable as described earlier. Compositions as described hereinbelow were prepared and found to be operable for a variety of ranges including 0.5 to 5% of the cationic sites occupied by silver; over 88% of cationic sites occupied by lithium; and with other alkali and alkaline earth metals constituting the balance. The compositions contain the aforesaid metallic clusters where the metal (M), copper or silver, is desirably partially metallic. This is exemplified by clusters of n number of metal atoms collectively having a charge represented by n−1. This is expressed as $M_n^{(n-1)}$ where n is 2 or more, and examples are $Ag_3^{2+}$ and $Ag_6^{5+}$.

The invention provides substantial advantages over conventional methods for separating nitrogen from an air mixture due to the effective and economical processes and adsorbents provided by the invention.

Objects, features, and advantages of the invention include an improved method for separating nitrogen from a gaseous mixture, and particularly for separating nitrogen from air. Another object is to provide new adsorbents used in such new separation method.

These and other objects, features, and advantages will become apparent from the following description of the preferred embodiment, claims, and accompanying drawings.

BRIEF DESCRIPTION OF THE DRAWINGS

FIG. 1 shows unit cell of faujasite-type (X and Y) zeolites including cation sites.

FIG. 2 shows adsorption isotherms for $N_2$, $O_2$ and Ar measured at 25° C. for $Li_{96}$—X-1.0 Si/Al zeolite dehydrated in vacuo at 350° C. This nominal $Li_{96}$—X-1.0 is $Li_{94.5}Na_{1.5}$—X-1.0.

FIG. 3 shows $N_2$ adsorption isotherms, measured at 25° C. for (a) nominal $Li_{86}$X-1.25 Si/Al which is $Li_{77}Na_9$X-1.25 and (b) nominal $Li_{96}$—X-1.0 Si/Al which is $Li_{94.5}Na_{1.5}$—X-1.0. Both materials were dehydrated in vacuo at 350° C.

FIG. 4 shows adsorption isotherms measured at 25° C. for $N_2$, $O_2$ and Ar on nominal $Ag_{9.6}$—X-1.0 Si/Al zeolite which is $Ag_{95.5}Na_{0.3}$—X-1.0 dehydrated in vacuo at 450° C.

FIG. 5 shows $N_2$ adsorption isotherms, measured at 25° C., for (a) nominal $Ag_{86}$—X-1.25 Si/Al which is $Ag_{85.7}Na_{0.3}$—X-1.25 and (b) nominal $Ag_{96}$—X-1.0 Si/Al which is $Li_{95.7}Na_{0.3}$—X-1.0. Both materials were dehydrated in vacuo at 450° C.

FIG. 6 shows $N_2$ adsorption isotherm, measured at 25° C., for $Li_xAg_y$—X-1.0 Si/Al ($Li_xAg_y$—X-1.0) zeolites dehydrated in vacuo at 450° C. This shows the addition of increasing amounts of Ag results in a change in the general aspect of isotherm toward that of the fully $Ag^+$-exchanged material.

FIG. 7 shows $N_2$ adsorption isotherm, measured at 25° C., for nominal $Ag_{96}$—X-1.0 Si/Al which is $Ag_{95.7}Na_{0.3}$—X-1.0 (left) and nominal $Li_{96}$—X-1.0 Si/Al which is $Li_{94.5}Na_{1.5}$—X-1.0 (right). The materials were dehydrated in vacuo at (a) 350° C. and (b) 450° C.

FIG. 8 shows plots of ln(P) vs 1/T at different coverages for nominal $Li_{96}$—X-1.0 Si/Al which is $Li_{94.5}Na_{1.5}$—X-1.0 (left) and nominal $Li_{94.5}Ag_1$—X-1.0 Si/Al which is $Li_{94.2}Na_{0.7}Ag_1$—X-1.0 (right).

FIG. 9 shows isosteric heats of adsorption of $N_2$ for nominal $Li_{96}$—X-1.0. Si/Al which is $Li_{94.5}Na_{1.5}$—X-1.0 and nominal $Li_{95}Ag_1$—X-1.0 Si/Al which is $Li_{94.2}Na_{0.7}Ag_1$—X-1.

FIG. 10 shows $N_2$ and $O_2$ isotherms for nominal $Li_{95}Ag_1$—X-1.0 Si/Al which is $Li_{94.2}Na_{0.1}Ag_{1.1}$—X-1.0 dehydrated in vacuo at 450° C. and for nominal $Li_{96}$—X-1.0 Si/Al which is $Li_{94.5}Na_{1.5}$—X-1.0 dehydrated in vacuo at 350° C. All isotherms were measured at 25° C.

DETAILED DESCRIPTION OF THE PREFERRED EMBODIMENTS

In one aspect, the invention provides type X zeolites comprising varying mixtures of Li and one or more transition metal having +1 valence state and selected from Ag (silver), Cu (copper), and mixtures thereof. The invention is demonstrated using silver. The experimental results show that even very small amounts of the +1 transition metal leads to beneficial results. Small amounts of Ag on the order of less than 5 Ag per unit cell (UC) were very effective. The addition of very small amounts of Ag and the proper dehydration conditions resulted in the formation of silver clusters and enhanced adsorptive characteristics and increased energetic heterogeneity as compared to those of the fully exchanged Li-zeolites. The performance for air separation by the best of these sorbents, containing, on the average, only one Ag per unit cell, was compared to that of the fully $Li^+$-exchanged zeolite using a standard PSA cycle by numerical simulation. The results show that the new sorbent provides a significantly higher (>10%) product throughput, at the same product purity and recovery, when compared to that of the fully $Li^+$-exchanged zeolite.

Silver has been found to have very strong effects on the adsorption characteristics of zeolites. The synthesis of a mixed lithium-silver (80/20) ion-exchanged X-type zeolite (Si/Al=1.25 with approximately 17 $Ag^+$ per unit cell), has been identified for possible superior properties for air separation. This sorbent utilized the very strong adsorptive properties of the $Ag^+$ ion which provided for increased capacity over that of the Li—X while maintaining some degree of the advantageous isotherm linearity that is seen with Li—X. Ab inito molecular orbital calculations showed the adsorption of nitrogen was enhanced by weak chemical interaction (through a classical n-complexation bond) with the $Ag^+$ cation on the zeolite framework.

Transition metal ions were reduced in zeolites for the purpose of forming highly dispersed metallic clusters for use as catalysts. This generally involved treatment at elevated temperatures and/or in reducing atmospheres (e.g., sodium vapor, hydrogen gas, carbon monoxide gas). However, color changes upon vacuum dehydration of silver-exchanged A-type zeolites were found to be related to the formation of metallic clusters within the sodalite cage or the 6-prism of the zeolite. Using volumetric sorption techniques and temperature programmed desorption, it was possible to relate these color changes to an autoreductive process involving framework oxygens. Autoreduction is the reduction of the transition metal ion and the oxidation of water or lattice oxygen; this has been observed for both $Ag^*$ and $Cu^{2+}$ ions in zeolites A, X and Y, and has been shown to take place by two mechanisms in two clearly defined temperature regions: (i) autoreduction in the presence of zeolite water (25–250° C.) (See Equation 1; and (ii) autoreduction by oxygen from the zeolite lattice (127–380° C.) (See Equation 2).

While not wishing to be held to any particular theory, in one aspect the formation of octahedral hexasilver metal clusters stabilized by coordination to six silver ions (($Ag^+$)$_6(Ag^0)_6$) is proposed from x-ray structural determinations of a dehydrated silver-exchanged zeolite A. In another aspect, it is suggested that the formation of such large metal clusters is improbable since color changes are seen even at low temperatures and low silver loadings where extensive migration of neutral silver atoms and subsequent sintering into $Ag_6$ metal clusters is highly unlikely. In still another aspect, based on structural studies of Ag—A zeolites, the formation of linear $(Ag_3)^{2+}$ charged clusters ($Ag^+$—$Ag^0$—$Ag^+$) is thought to occur upon thermal dehydration of the zeolite. Color changes were followed along with concomitant silver cluster formation in A, X, and Y zeolites using x-ray diffraction (XRD) techniques. Here, it was found that the number of clusters increased with framework Al content. It was also noted that in synthetic analogs of the faujasite zeolite (types X and Y), the dehydrated zeolites displayed a yellow color w which increased in intensity with the number of clusters, while silver-exchanged A zeolites took a yellow color with dehydration at low temperatures, eventually becoming brick red after treatment at higher temperatures.

The present invention provides type X zeolites containing varying amounts of Li and along with the Li, one or more of Ag and Cu. These materials are heat treated in a way which promotes the formation of intracrystalline silver clusters or copper clusters. The resulting adsorptive characteristics were evaluated with respect to the gases which are of primary interest in the separation of air: $N_2$, $O_2$ and Ar. The performance of the best of these sorbents was compared to that of the fully $Li^+$-exchanged zeolite using a numerical simulation of a standard five-step PSA cycle, that is used in industry, and the results are given below.

Experimental Section Materials

Two type-X zeolites, differing only by the Si/Al ratio, were used in this work. These were: (1) X-type zeolite with a Si/Al of 1.0 (Praxair, #16193-42, sometimes referred to as LSX, low silica X-zeolite), and (2) X-type zeolite with a Si/Al of 1.25 (Linde, lot 945084060002). Both of these materials were binderless, hydrated powders.

Helium (99.995%, prepurified), oxygen (99.6%, extra dry), nitrogen (99.998%, prepurified) and argon (99.998%, prepurified) were obtained from Cryogenic Gases. All water used was deionized.

Cation Exchange

Since the sodium form of the zeolite exchanges more readily with most cations in consideration, all zeolites were first ion-exchanged with a solution of sodium chloride in order to convert to the $Na^+$ form. A dilute NaOH solution was used to keep the NaCl solution at pH≈9. This helped to prevent hydrolysis and break down of the zeolite crystal structure during the ion-exchange process. The resultant Na-zeolite was then used as the starting material for all other syntheses.

Preparation of Li-Zeolites

The lithium zeolites were prepared by 5 consecutive static ion-exchanges using a 6.3-fold excess (over that necessary for full ion-exchange) of a 2.2 M solution of LiCl. This was done in a 0.01 M solution of LiOH at a pH≈9. The lithium ion-exchange solution was heated to a mild boil and then allowed to cool and settle. The solution was decanted, a fresh 6.3×LiCl solution was added, and the procedure was repeated for a total of 5 exchanges. After the final ion-exchange, the material was vacuum filtered and washed with copious amounts of deionized water until no free ions were present in the filter water (i.e., no AgCl precipitation upon treatment with $Ag^+$). The resulting lithium exchanged zeolites were dried overnight at 100° C. in a conventional oven before being dehydrated in vacuo prior to measurement of adsorption isotherms.

Preparation of Ag-Zeolites The silver zeolites were prepared by 2 consecutive ion-exchanges using a 0.05 M solution of $AgNO_3$. Each silver solution contained a cation content which was double that required for 100% exchange. The silver ion-exchange solution was heated to a mild boil and immediately allowed to cool and settle. As with the lithium ion-exchange, the solution was decanted, fresh $AgNO_3$ solution was added, and the procedure was repeated for a total of 2 exchanges. After the second ion-exchange, the material was vacuum filtered and washed with copious amounts of deionized water until no free ions were present in the filter water (i.e., no precipitation upon treatment with $Cl^-$). The silver exchanged materials were dried at room temperature and atmospheric conditions in a dark area. The resulting materials were then stored in a dark area until they were dehydrated in vacuo prior to analysis, Preparation of $Li_xAg_y$-Zeolites The $Li_xAg_y$-zeolites were prepared by ion exchange of a Li-zeolite (prepared as described above) with a 0.05 M solution of $AgNO_3$. This silver solution contained a cation content which was equivalent to the targeted amount. This was possible with silver ion-exchange because the silver cation is quickly and easily exchanged. The silver ion-exchange solution was heated to a mild boil and immediately allowed to cool and settle. The resulting material was vacuum filtered and washed with copious amounts of deionized water. Complete incorporation of the targeted silver ions was verified when no precipitation was observed in the filtered water upon treatment with $Cl^-$. These mixed cation materials were dried at room temperature and atmospheric conditions in a dark area and were stored in a dark area until they were dehydrated in vacuo prior to analysis. The $Li_xAg_y$-zeolites are more accurately referred to as $Li_xNa_yAg_z$-zeolites since ion exchange is rarely exhaustive and there is almost always some residual $Na^+$ present in the starting Li-zeolite.

Dehydration

Prior to measurement of the adsorption isotherms or uptake rates, it is necessary to dehydrate the zeolite sample. Zeolites have a strong affinity for water; and some molecules are tenaciously held. The presence of water in the zeolite significantly affects the validity of the adsorption measurement. Prior to analysis, all samples were heated in order to remove water. Differential thermal analysis (DTA) of zeolite X demonstrated a continuous loss of water over a broad range of temperatures, starting at slightly above room temperature up to 350° C. with a maximum at about 250° C. Specific dehydration conditions varied from sample to sample and are given for each sample.

Characterization

The ion-exchanged, mixed LiAgX zeolite samples were analyzed for Ag and Li contents using an inductively coupled plasma mass spectrometer (ICP-MS, Hewlett Packard HP 4500). The samples were first digested in concentrated nitric acid solution at 100° C. for 20 minutes. At the end of digestion, the samples were further diluted and filtered. The filtrates were subjected to ICP-MS analyses.

The adsorption isotherms were measured using a static volumetric system (Micrometrics ASAP-2010). Additions of the analysis gas were made at volumes required to achieve a targeted set of pressures. A minimum equilibrium interval of 9 seconds with a tolerance of 5% of the target pressure (or 0.007 atm, whichever was smaller) was used to determine equilibrium for each measurement point. The pressure transducers in the, ASAP-2010 are accurate to <0.2% for the pressure range of 0–1 atm. The sample weights were obtained using a digital laboratory balance which is accurate to 0.01 g. The isotherm measurements and the samples themselves were found to be highly reproducible.

In addition, the samples were compositionally characterized using neutron activation analysis (NAA) in the research nuclear reactor of the Phoenix Memorial Laboratory at the University of Michigan. The samples were irradiated sequentially for one minute at a core-face location with an average thermal neutron flux of $2 \times 10^{12}$ $n/cm^2/s$. Two separate gamma-ray spectra were then collected for each sample with a high resolution germanium detector: one after a 13 minute decay to determine the concentrations of Al and Ag, and a second after a 1 hour and 56 minute decay to analyze for Na and both were for 500 seconds real time. Four replicates of NBS-SRM-1633a (coal fly ash) and silver foil were used as standard reference materials and check standards. Absorbent parameters and PSA simulation results are described with reference to Tables 1–3. Results of compositional characterization (NAA and ICP-MS) are given in Table 4. The unit cell compositions for those analyzed samples are given in Table 5.

Results and Discussion

All samples are identified according to the type of zeolite, the number of charge compensating cation(s) present in a unit cell, and the Si/Al ratio. For example, $Li_{86}$—X-1.25 refers to an X-type zeolite with Si/Al=1.25 which has been fully exchanged to contain 86 $Li^+$ cations per unit cell. The sample $Li_{96}Ag_{10}$—X-1.0 refers to an X-type zeolite with Si/Al=1.0 which contains 86 $Li^+$ and 10 $Ag^+$ (or other forms of Ag) per unit cell. The sample $Li_{94.2}Na_{0.7}Ag_{1.1}$—X-1.0 refers to an X-type zeolite with Si/Al=1.0.which contains, on average, 94.2 $Li^+$, 0.7 $Na^{30}$, and 1.1 $Ag^+$ (or other forms of Ag) per unit cell, as determined from the neutron activation (NA) and ICP-MS analyses. It should be noted that the zeolites herein are referred to for convenience by the nominal amount of Li and Ag substituted for the Na. More precise values are given for each of the zeolites. For example, $Li_{96}$—X-1.0 is more precisely $Li_{94.5}Na_{1.5}$—X-1.0, since replacement of the Na by Li is not fully accomplished.

Adsorption Isotherms for Fully Exchanged Li and Ag Zeolites

FIG. 2 shows the $N_2$, $O_2$ and Ar adsorption isotherms, measured at 25° C., for $Li_{96}$—X-1.0 ($Li_{94.5}Na_{1.5}$—X-1.0) after vacuum dehydration at 350° C. This zeolite was used in adsorptive air separation because of its very high $N_2$ capacity and very favorable $N_2$:$O_2$ selectivity (approximately 6:1 at 1 atm) as well as its $N_2$ isotherm linearity. FIG. 3 shows the enhancement in the $N_2$ adsorption capacity for $Li_{96}$—X-1.0 ($Li_{94.5}Na_{1.5}$—X-1.0) over that of the $Li_{86}$—X-1.25 ($Li_{77}Na_9X$-1.25).

FIG. 4 shows $N_2$, $O_2$ and Ar adsorption isotherms for $Ag_{96}$—X-1.0 ($Ag_{95.7}Na_{0.3}$—X-1.0), all measured at 25° C., after vacuum dehydration at 450° C. for a minimum of 4 hours. These samples were all initially gray in color, but after vacuum dehydration turned to a deep golden yellow, indicating the formation of silver clusters. FIG. 5 shows the enhancement in the $N_2$ adsorption capacity for $Ag_{96}$—X-1.0 ($Ag_{85.7}Na_{0.3}$—X-1.25)over that of the $Ag_{86}$—X-1.25 ($Li_{85.7}Na_{0.3}$—X-1.0). While the fully exchanged Ag-zeolites, like their Li-zeolite analogs, have very high $N_2$ capacity and favorable $N_2$:$O_2$ selectivity, they are not favorable for use in adsorption-based separations. Because of the strong adsorption of $N_2$ at low pressure, creating a low pressure "knee" in the adsorption isotherm shown in FIG. 4, the working capacity (i.e., the $\Delta Q$, the change in the adsorptive capacity from the typically used adsorption pressure of 1.0 to a desorption pressure of 0.33 atm) is very small; and the sorbent must be exposed to very low pressure conditions in order to increase that working capacity.

Some Ag-zeolites are demonstrated to have a selectivity for Ar over $O_2$. The present examples and data reveal that the Ag-zeolites which had been dehydrated in vacuo at 350° C. also showed a selectivity for Ar over $O_2$. However, the Ag-zeolites which had been dehydrated in vacuo at 450° C. had approximately the same adsorption capacity for Ar and $O_2$ (as shown in FIG. 4). This is probably due to increased interaction between the charged Ag-clusters and the quadrupole moment of the $O_2$ molecule (whereas, the Ar has no quadrupole moment).

In FIG. 2, it can be seen that the comparative lithium exchanged sodium zeolite is highly selective for the absorption of nitrogen and also preferentially absorbs oxygen as compared to argon. This is undesirable for the purification of oxygen since the less selectively absorbed argon will remain with the oxygen product. Turning to FIG. 4, it can be seen that the silver exchanged sodium zeolite has high selectivity for nitrogen but is not preferentially selective for oxygen as compared to argon. This means that the purified oxygen stream will not be relatively argon rich as compared to the pre-absorbed argon content. The mixed lithium silver zeolite of the present invention is adaptable for selectivity for argon as compared to oxygen. This means that the lithium silver zeolite of the invention is most favorable for oxygen production because the argon will be removed along with the nitrogen, providing an oxygen stream after absorption which has a smaller fraction of argon. Accordingly, the mixed lithium silver zeolite of the invention is more favorable for oxygen production because it provides absorption of nitrogen without the disadvantage of also being highly selective for absorption of oxygen over argon.

Adsorption Isotheras for Mixed Cation ($Li_xAg_y$) Zeolites

The $N_2$ adsorption isotherms, measured at 25° C., for $Li_xAg_y$—X-1.0 ($Li_xAg_1$—X-1.0)zeolites, after being vacuum dehydrated at 450° C. for a minimum of 4 hours, are shown in FIG. 6. These zeolites contained varying amounts of Ag per unit cell ranging from zero (i.e., the fully exchanged $Li_{96}$—X-1.0 (Li94.5$Na_{1.5}$—X-1.0 )sorbent) to 10 (the $Li_{86}Ag_{10}$—X-1.0 sample ($Li_{73.8}Na_{1.2}Ag$)). This plot reveals that the incorporation of only a small amount of silver changes the adsorptive properties as compared to the fully exchanged $Li_{96}$—X-1.0. With increasing additions of $Ag^+$ (and corresponding removal of $Li^+$) the adsorption isotherms begin to take on more of the characteristics of the fully exchanged $Ag_{96}$—X-1.0 ($Ag_{95.7}Na_{0.3}$—X-1.0)material (i.e., the high "knee" at low pressures).

Dehydration and Formation of Ag-clusters

As mentioned earlier, zeolites have a strong affinity for water; and some molecules are held tenaciously. The zeolites must be completely dehydrated prior to measurement of the adsorption isotherms in order to guarantee the validity of the result. Importantly, it was found that the dehydration conditions have a very significant effect on the formation of silver clusters. The atmosphere and temperature of the dehydration were found to be the most important. FIG. 7 shows $N_2$ adsorption isotherms for the fully exchanged $Ag_{96}$—X-1.0 (left) and the fully exchanged $Li_{96}$—X-1.0 (right), both after vacuum dehydration at 350° C. and 450° C. For the fully exchanged Li zeolite, there was no significant increase in the $N_2$ capacity (or in the shape of the adsorption isotherm) for the material dehydrated at 450° C. over that dehydrated at 350° C. This was expected as the majority of the hydrate was easily removed by 250° C. and most tenaciously held water molecules were removed by 350° C. However, the fully exchanged $Ag_{96}$—X-1.0 sample does show an increase in $N_2$ capacity after dehydration at 450° C. over that of the same sample dehydrated at 350° C. This increase cannot be attributed a loss of water since all but the most tenaciously held water is removed by 350° C.; and there is no increase in the $N_2$ capacity for other zeolite forms ($Li^+$, $Na^+$, $K^+$, etc.) with dehydration at temperatures beyond 350° C. This increase, therefore, was the result of the formation of silver clusters in the zeolite with dehydration at high temperature.

A series of $N_2$ adsorption isotherms were measured for Ag96—X-1.0 and $Li_{86}$—$Ag_{10}$—X-1.0 after partial or full dehydration in vacuum at various temperatures. The results for both zeolites showed a continual increase in the $N_2$ adsorption capacity (at 1 atm) with increasing dehydration temperature up to about 450 to about 500° C. Samples which had been dehydrated in vacuum at 550° C. and 600° C. had $N_2$ capacities which were considerably lower than those dehydrated in vacuum at the 450–500° C. range.

It was striking that the ultimate adsorptive characteristics of the silver-containing zeolites were very dependent upon the formation of silver clusters and, therefore, on the dehydration conditions. Best results were obtained when the silver-containing zeolites were dried at room temperature before being completely dehydrated in vacuum at a temperature of at least 450° C., but no greater than 500° C. The results also showed that the zeolites are most preferably held at the dehydration temperature for a minimum of 4 hours.

Heat of Adsorption and Energetic Heterogeneity

Heterogeneity in zeolites may result from a number of causes. The existence of different cation sites is one of them. If the intra-crystalline cation population is mixed, sites in the vicinity of a cation will differ for each cation whether or not they occupy equivalent crystallographic positions. Further, in a mixed cation population the proportion of one cation to another may vary from one cavity to another so that the behavior of the cavities as multiple sorption sites may vary throughout the crystal.

The presence of energetic heterogeneity of a sorbent can be determined by plotting the isoteric heat of adsorption versus the amount adsorbed. Energetic heterogeneity of the system will result in a decrease in the isoteric heat of adsorption as the amount sorbed increases. For small uptakes, the isoteric heat may decrease rather strongly with the amount adsorbed. This would be an indication that there are some local intracrystalline positions where the guest molecules are preferentially sorbed more strongly than in the rest of the intracrystalline volume. At intermediate uptakes, the slope of this plot will usually decrease and become nearly constant.

The measurement of adsorption isotherms at different temperatures permits the calculation of the heat of adsorption as a function of surface coverage. When experimental data are reported as a set of adsorption isotherms for a particular gas-adsorbent system, the differential isoteric heat of adsorption is determinable. The isoteric heat of adsorption is calculated from a series of isotherms by application of the Clausius-Clapeyron equation given below as Equation (3).

Using the data from nitrogen and oxygen adsorption isotherms measured at 50° C., 25° C., and 0° C., the isoteric heats of adsorption were determined by evaluating the slope of a plot of $\ln(P)$ versus $(1/T)$ at several coverages. The plots of $\ln(P_{N2})$ versus $(1/T)$ at several coverages for $Li_{96}$—X-1.0 and $Li_{95}Ag_1$—X-1.0 ($Li_{94.2}Na_{0.7}Ag_{1.1}$—X-1.0) are shown in FIG. 8. The isoteric heats of adsorption at different coverages were calculated for each of these materials and are shown in. FIG. 9. A similar analysis was also done for the oxygen and argon data, but these results are not shown. From the plots of the heats of nitrogen adsorption, shown in FIG. 9, one can see that the isoteric heat of adsorption for $N_2$ on $Li_{95}Ag_1$—X-1.0 is quite high (≈8 kcal/mol) at low coverages, but immediately drops sharply to become nearly horizontal. This indicates the presence of local intracrystalline sites where the $N_2$ is preferentially sorbed more strongly than at other sites within the intracrystalline volume. A comparison with the same plot of the isoteric heat of adsorption for $N_2$ on $Li_{96}$—X-1.0, which is essentially horizontal, shows that the energetic heterogeneity of the $Li_{95}Ag_1$-LSX zeolite is due entirely to the incorporation of the one Ag per unit cell. The plots of the heats of adsorption for $O_2$ and Ar were horizontal with coverage, indicating the interaction between the silver clusters and these guest molecules was much less than with the $N_2$. The approximately constant heat of adsorption with increasing coverage for the $Li_{96}$—X-1.0 is consistent with expected results, and likely indicates an energetically homogeneous surface.

Cation Site Location

For the X zeolites, the cation site designations are conventionally designated as SI (the center of the hexagonal prism), SI' (opposite SI but located in the cubooctahedron), SII (single six-ring in the supercage), SII' (opposite SII but inside the cubooctahedron), and SIII (near the four-ring windows in the supercage).

Several studies have been undertaken in order to locate extra framework $Li^+$ cations in X, Y and A zeolites using solid state NMR and neutron diffraction methods. It was found that the $Li^+$ ions fully occupy all 32 SI' sites and all 32 SIT sites. The SIII sites were then occupied with the remaining $Li^+$ ions, 22 for $Li_{86}$—X-1.25 and 32 for $Li_{96}$—X-1.0. No occupancy of the SI sites was observed. One report noted an occupancy "threshold" of 64 Li cations. Mixed $Li_xNa_y$—X zeolites which contained $Li^+$ less than this threshold amount did not show any increase in the $N_2$ adsorption capacity over that of the fully $Na^+$-exchanged samples. This indicated that only those $Li^+$ ions located in the SIII cation sites were interacting with the $N_2$ molecules. This result is interesting because, even though the SI and SI' sites are sterically inaccessible to the $N_2$ molecules, the SII sites are not; while other cations, such as $Ca^{2+}$, do interact with $N_2$ when located in the SIT positions.

In order to identify the location of $Ag^+$ ions and Ag-clusters, typically x-ray diffraction methods and far-infrared spectroscopy were used. It was found that, for dehydrated fully $Ag^+$-exchanged faujasite-type zeolites, the silver atoms/ions were distributed among the six-ring sites (SI, SI', and SI for type X) and, for samples with high Al content, in the SIII locations. There is also the simultaneous occupancy of sites SI and SI' by linear ($Ag^+$—$Ag^0$—$Ag^+$) clusters. In general, it appears that the Ag atoms/ions preferred the SI and SI' sites.

While it appears that the $Ag^+$ ions prefer SI and SI' locations, it is also known that the $Li^+$ ions also strongly prefer the SI' sites. A specific study to identify the location of $Li^+$ and $Ag^+$ cations mixed $Li_xAg_y$-zeolites has not yet been done. While not wishing to be held to any particular theory, it is thought that both of these sites are sterically inaccessible to the $N_2$ and $O_2$ molecules. Therefore, the formation of silver clusters in these locations may not have a strong effect on the overall adsorptive characteristics of the mixed $Li_xAg_y$—X zeolites. Therefore, it is expected that the clusters, in these mixed cation zeolites, are instead formed at the $N_2$ and $O_2$ accessible SII and/or SIII locations due to competition with the $Li^+$ cations for the preferred SI and SI' locations. Logically, Ag-cluster formation at the SII sites would most enhance the adsorptive characteristics of mixed $Li_xAg_y$—X zeolites since these sites have been shown to be non-interactive when occupied with $Li^+$ ions. The location of Ag in mixed $Na_xAg_y$—A zeolites was investigated and it was found that the Ag ions prefer six-ring sites (such as the SI, SI' and SII in the X zeolites). This may indicate a preference for the SII sites in type X zeolites when the SI and SI' sites may be unavailable (due to competition with $Li^+$) Another possibility is that the Ag clusters were formed at the SI–SI' sites, and due to the strong field gradient that is generated by $Ag^+$, enhanced interactions with the $N_2$ molecules is still possible. This possibility would account for the fact that 1 Ag per unit cell resulted in the optimal sorbent because each $Ag_3^{2+}$ cluster was shared by three supercage cavities.

The Nature of the Interaction

The total energy of physical adsorption $\phi_T$, is the result of the interactions between the adsorbate molecules and interactions between the adsorbate molecules and the zeolite cavity wall. The $\phi_T$ is comprised of dispersive (D), repulsive (R), polarization (P), field-dipole (FD) interactions, field-quadruple (FQ) interactions, and adsorbate-adsorbate energies and can be written as per Equation (4). The adsorbates of interest in this evaluation ($N_2$, $O_2$ and Ar) do not have permanent dipoles; and the coverages are low. Therefore, the field-dipole and adsorbate-adsorbate interactions can be ignored and Equation 4 can be reduced to Equation (5). Because the $N_2$ and $O_2$ molecules are very similar in size and have comparable polarizabilities, the dispersive, repulsive and polarization energies between the adsorbate and the extra-framework cations are very similar. The quadruple moment of the $N_2$ molecule is approximately four times that of the $O_2$ molecule and is primarily responsible for the difference in the adsorptive capacity for $N_2$ over that of $O_2$. Argon, which does not have a quadruple moment, is more affected by the polarization energy; and for most zeolites, the Ar capacity is about the same as that of $O_2$.

The very high heat of binding of the $N_2$ molecules at very low pressures is probably due to very high electrostatic fields near the exposed charged Ag-clusters and their interaction with the quadruple moment of the $N_2$ molecule. However, because there is also an increase in the adsorption of argon, which does not have a quadruple moment, these charged clusters must also contribute to the total energy of physical adsorption by increased van der Waals and field-induced dipole energies and could possibly have a higher polarizing power than that of isolated silver cations.

Physical adsorption, however, is likely not the only contribution to $N_2$ adsorption in silver-containing zeolites. Given the high isoteric heat of adsorption for $N_2$ on $Ag_{16}$—X-1.25 zeolites combined with a relatively slow desorption of $N_2$ on the same, some degree of weak n-complexation is likely present. The n-complexation character of the interaction was confirmed by ab initio molecular orbital calculations using $N_2$ and Ag—X cluster model. This n-complexation character is also referred to as being weak chemisorption-assisted adsorption.

PSA Cycle Description

A standard five-step PSA cycle as is presently used in industry for air separation was used in this study. See U.S. Pat. No. 5,074,892, Levitt, incorporated herein by reference in its entirety. The steps involved in each cycle are as follows: (step I) pressurization with the feed gas, namely 22% $O_2$ (mixture of $O_2$ and Ar) and 78% $N_2$; (step II) high pressure adsorption with the feed gas, or feed step; (step III) co-current depressurization; (step IV) countercurrent blowdown; and (step V) countercurrent low pressure purge with the product of the feed step (oxygen).

All the above steps were of equal duration (30 seconds); thus the time required for the completion of each PSA cycle was 2.5 minutes. The model assumed only two adsorbable components, $O_2$ and $N_2$. The oxygen component (22%) was actually a mixture of $O_2$ and Ar which have very similar adsorption isotherms for the sorbents of interest. The product of each cycle was comprised of a volumetric mixture of the output stream of the feed step and the co-current depressurization step. A portion of this product stream was used to purge the bed countercurrently in step V.

In order to compare the performance of the $LI_{96}$—X-1.0 and the $LI_{95}Ag_1$—X-1.0 sorbent developed in this work, the product throughputs of the two sorbents were studied under two different cycle conditions using computer simulations. In order to facilitate a fair comparison of the sorbent performance, the cycle conditions were optimized such that the product purity and product recovery obtained were the same for both the sorbents in each respective simulation run. In this work, the product purity, product recovery and product throughput are defined as per Equations (6), (7), and (8).

The mathematical model and the numerical method used for the PSA simulations in this work will be explained to the extent necessary for fundamental understanding. The basic assumptions are as follows. The model used assumed the flow of a gaseous mixture of two components in a fixed bed packed with spherical adsorbent particles. The bed is considered to be adiabatic and diffusional resistance is assumed to be negligible since the diffusion of $O_2$ and $N_2$ in the adsorbents is essentially instantaneous, as observed in this study. Thus, there is local equilibrium between the gas and the solid phase of each gas component. Axial dispersion for mass and heat transfer is assumed but dispersion in the radial direction is taken to be negligible. Axial pressure drop is neglected and ideal gas law is assumed to hold since pressures involved are near atmospheric. Also the gas is assumed to have constant viscosity and heat capacity.

The pure component equilibrium amounts adsorbed on the respective adsorbents were fit using the well-known Langmuir isotherm with temperature dependent terms. The equilibrium loading under mixture conditions were then predicted by the extended Langmuir equation in the simulation model as per Equation (9). The temperature dependence of the Langmuir parameters is assumed to be as per Equation (10). The values of the Langmuir equation terms for $Li_{96}$—X-1.0 ($Li_{94.5}Na_{1.5}$—X-1.0)and $Li_{95}Ag_1$—X-1.0 ($Li_{94.2}Na_{0.7}Ag_{1.1}$—X-1.0) sorbents, as well as the heats of adsorption are given in Table 1. Additional background of general interest, and not necessary to understanding of the invention may be found in Ind. Eng. Chem. Res. 36, 5358 (1997).

Simulation Results

The PSA bed characteristics and the operating conditions used are summarized in Table 2. The PSA cycle parameters were chosen as close to industrially acceptable values as possible. The pressure ratio, which is the ratio of the feed pressure (PH) to the desorption pressure (PL), is an important operating characteristic and it has been shown that a value of 3 suffices for an optimal PSA performance using the $Li_{96}$—X-1.0 sorbent. The same pressure ratio was employed for the comparison of the $Li_{96}$—X-1.0 ($Li_{94.5}Na_{1.5}$—X-1.0) and $Li_{95}Ag_1$—X-1.0 ($Li_{94.2}Na_{0.7}Ag_{1.1}$—X-1.0) sorbents in this work. Hereafter below, the nominal formulas $Li_{96}$—X-1.0 and $Li_9Ag_1$—X-1.0 are referred to. As can be seen from Table 3, run 1 had a feed pressure of 1.0 atm while run 2 was carried out at a higher feed pressure of 1.2 atm. The co-current depressurization pressure, feed velocity and purge velocity were optimized so as to obtain the same product purity and recovery for both the sorbents. As seen from the $O_2$ and $N_2$ isotherms in FIG. 10, the $Li_{95}Ag_1$—X-1.0 sorbent has a higher capacity for $N_2$. From the extended Langmuir isotherm (Equation 9), it follows that the higher $N_2$ loading further suppresses the $O_2$ loading under mixture conditions, and as a result the working capacity of the $Li_{95}Ag_1$—X-1.0 sorbent further increases. Hence the amount of bed utilization (or the depth of propagation of the $N_2$ wavefront in the bed) of the $Li_{95}Ag_1$—X-1.0 sorbent was deeper than that of the $Li_{96}$—X-1.0 sorbent under identical cycle conditions. The higher capacity of the $Li_{95}Ag_1$—X-1.0 sorbent could be exploited by employing higher feed throughputs and lower co-current depressurization pressure without significantly lowering product purity and recovery. An important advantage of the higher capacity of the $Li_{95}Ag_1$—X-1.0 sorbent was a higher product throughput compared to that of the $Li_6$—X-1.0 sorbent when the other performance parameters (i.e., product purity and recovery) were kept the same. However, the heats of adsorption of the two components on the $Li_{95}Ag_1$—X-1.0 sorbent were also higher than those on the $Li_{96}$—X-1.0 sorbent. Severe temperature rise during adsorption adversely affects PSA separation performance. Hence a PSA simulation run became necessary to critically evaluate the importance of higher $N_2$ loading in case of $Li_{96}Ag_1$—X-1.0 sorbent and the accompanying heat effects.

The results of the simulation runs are shown in Table 3. It can be seen from run 1 (feed pressure: 1 atm), the $O_2$ product throughput obtained by using $Li_{95}Ag_1$—X-1.0 sorbent was $5.4 \times 10^{-2}$ kg $O_2$/h/kg-sorbent compared to the throughput of $4.8 \times 10^{-2}$ kg $O_2$/h/kg-sorbent offered by the $Li_{96}$—X-1.0 sorbent. The corresponding $O_2$ product purity and recovery were approximately 96% and 62% respectively. There is an improvement of 12.5% in the product throughput which translates into considerable savings in capital and operating costs since a higher product throughput implies a smaller bed requirement for the same desired production. Another run was done at a different feed pressure of 1.2 atm with the cycle conditions optimized to produce $O_2$ product at 90.7% purity and 78% recovery. In this case as well, the product throughput of the $Li_{95}Ag_1$—X-1.0 sorbent was found to be higher ($7 \times 10^{-2}$ kg $O_2$/h/kg-sorbent), compared to that of the $Li_{96}$—X-1.0 sorbent ($6.3 \times 10^{-2}$ kg $O_2$/h/kg-sorbent). Thus, the product throughput of the $Li_{95}Ag_1$—X-1.0 sorbent is higher by 11% even at a lower $O_2$ product purity requirement. The values of the throughputs obtained in these experiments were found to have an order of magnitude agreement with those for $Li_{96}$—X-1.0 sorbent. From the simulated bed profiles, it was observed that temperature deviations from the feed temperature of 25° C. due to the adsorption heat effects were about 17° C. for the $Li_{95}Ag_1$—X-1.0 sorbent while it was only 12° C. for the a $Li_{96}$—X-1.0 sorbent. However, from the results it appears that the advantage of higher $N_2$ loading on the $Li_{95}Ag_1$—X-1.0 more than compensates the lowering of PSA performance due to higher heat effects. It is evident from the previous two examples that the $Li_{95}Ag_1$—X-1.0 sorbent is superior to the $Li_{96}$—X-1.0 sorbent for air separation by PSA.

| | Notation |
|---|---|
| b = | Langmuir parameter, $atm^{-1}$ |
| $D_{ax}$ = | Axial dispersion coefficient in adsorbent particles, $m^2/s$ |
| $\Delta H$ = | Heat of adsorption, kcal/mol |
| $k_1$ = | Langmuir temperature dependence constant, mmol/g |
| $k_2, k_4$ = | Langmuir temperature dependence constant, K |
| $k_3$ = | Langmuir temperature dependence constant, $atm^{-1}$ |
| P = | Partial pressure, atm |
| p = | Total pressure, atm |
| $q_m$ = | Langmuir parameter, mmol/g/atm |
| $q^*$ = | Equilibrium adsorbate loading, mmol/g |
| T = | Temperature, K |
| U = | Interstitial gas velocity, m/s |
| | Subscripts |
| CD = | Intermediate pressure corresponding to the co-current depressurization step |
| H = | Correspoding to the feed step |
| i = | Species 'i' |
| j, k = | Gas phase component index |
| L = | Low pressure corresponding to purge step |

TABLE 1

Parameters in the Temperature Dependent Langmuir Isotherms of $N_2$ and $O_2$ for the $Li_{96}$-X-1.0 and $Li_{95}Ag_1$-X-1.0 Adsorbents

| Sorbent | Sorbate | $k_1$ (mmol/g) | $k_2$ (K) | $k_3$ ($atm^{-1}$) | $k_4$ (K) | $-\Delta H$ (kcal/mol) |
|---|---|---|---|---|---|---|
| $Li_{96}$—X-1.0 | $O_2$ | 1.14 | 239.2 | $2.20 \times 10^{-3}$ | 1092 | 2.66 |
| $Li_{96}$—X-1.0 | $N_2$ | 1.69 | 134.4 | $1.19 \times 10^{-3}$ | 1990 | 5.16 |
| $Li_{96}Ag_1$—X-1.0 | $O_2$ | 0.965 | 196.0 | $2.25 \times 10^{-3}$ | 1212 | 3.00 |
| $Li_{95}Ag_1$—X-1.0 | $N_2$ | 2.12 | 64.82 | $7.78 \times 10^{-3}$ | 1494 | 5.39 |

TABLE 2

Adsorption Bed Characteristics and Operating Conditions Used in the PSA Simulations

| | |
|---|---|
| Bed length | 2.5 m |
| Diameter of adsorber bed | 1.0 m |
| Bed external porosity | 0.40 |
| Bed density | 720 kg/$m^3$ |
| Heat capacity of gases | 6.87 cal/mol/K |
| Heat capacity of bed | 0.28 cal/g/K |
| Wall temperature | 298 K (ambient) |
| Feed gas composition | 78% $N_2$, 22% $O_2$ |
| Feed gas temperature | 298 K |
| Axial dispersion coefficient ($D_{ax}$) | $5 \times 10^{-3}$ $m^2/s$ |

TABLE 3

PSA Simulation Operating Conditions and Results

| Sorbent | $P_H$ (atm) | $P_L$ (atm) | $P_{CD}$ (atm) | $U_H$ (m/s) | $U_L$ (m/s) | $O_2$ Product Purity (%) | $O_2$ Product Recovery (%) | Product throughput (kg $O_2$/h/kg adsorbent) |
|---|---|---|---|---|---|---|---|---|
| | | | | Run 1. | | | | |
| $LI_{96}$—X-1.0 | 1.0 | 0.33 | 0.70 | 0.48 | 0.38 | 96.11 | 62.03 | $4.84 \times 10^{-2}$ |
| $Li_{95}Ag_1$—X-1.0 | 1.0 | 0.33 | 0.69 | 0.60 | 0.42 | 96.42 | 62.74 | $5.40 \times 10^{-2}$ |
| | | | | Run 2. | | | | |
| $LI_{96}$—X-1.0 | 1.2 | 0.4 | 0.70 | 0.40 | 0.38 | 90.68 | 78.02 | $6.31 \times 10^{-2}$ |
| $Li_{95}Ag_1$—X-1.0 | 1.2 | 0.4 | 0.71 | 0.50 | 0.38 | 90.83 | 78.48 | $7.01 \times 10^{-2}$ |

TABLE 4

Elemental Composition of Li$_x$Ag$_y$-X-1.0 Zeolite Samples*

| | Sample 1 | | Sample 2 | | Sample 3 | |
|---|---|---|---|---|---|---|
| Comp. | wt. % | +/− | wt. % | +/− | wt. % | +/− |
| Al | 21.38 | 0.88 | 21.19 | 0.87 | 20.80 | 0.85 |
| Ag | 0.00 | — | 0.93 | 0.06 | 3.04 | 0.06 |
| Na | 0.28 | 0.02 | 0.14 | 0.01 | 0.10 | 0.01 |
| Li | 5.59 | — | 5.21 | — | 4.99 | — |

| | Sample 4 | | Sample 5 | | Sample 6 | |
|---|---|---|---|---|---|---|
| Comp. | wt. % | +/− | wt. % | +/− | wt. % | +/− |
| Al | 19.45 | 0.81 | 18.37 | 0.75 | 11.91 | 0.49 |
| Ag | 9.57 | 0.16 | 15.64 | 0.12 | 55.49 | 0.27 |
| Na | 0.11 | 0.01 | 0.22 | 0.01 | 0.03 | 0.01 |
| Li | 4.76 | — | 3.85 | — | 0.00 | — |

*Lithium was measured by inductively coupled plasma-mass spectroscopy (ICP-MS); all others were measured by neutron activation analysis (NAA).

TABLE 5

Unit Cell Composition for Each of the Li$_x$Ag$_y$—X-1.0 Samples

| Comp. | 1 atm/uc | 2 atm/uc | 3 atm/uc | 4 atm/uc | 5 atm/uc | 6 atm/uc |
|---|---|---|---|---|---|---|
| Al | 96.0 | 96.0 | 96.0 | 96.0 | 96.0 | 96.0 |
| Ag | 0.0 | 1.1 | 3.5 | 11.5 | 21.0 | 95.7 |
| Na | 1.5 | 0.7 | 0.5 | 0.6 | 1.2 | 0.3 |
| Si | 96.0 | 96.0 | 96.0 | 96.0 | 96.0 | 96.0 |
| Li | 94.5 | 94.2 | 92.0 | 83.9 | 73.8 | 0.0 |
| O | 384.0 | 384.0 | 384.0 | 384.0 | 384.0 | 384.0 |

Equations (i) autoreduction in the presence of zeolite water (25–250° C.)

$$2(Ag^+ - Z - O^-) + H_2O \rightarrow 2Ag^0 + (\tfrac{1}{2})O_2 + 2Z - OH \quad (1)$$

(ii) autoreduction by oxygen from the zeolite (127–380° C.)

$$2(Ag^+ - Z - O^-) \rightarrow 2Ag^0 + (\tfrac{1}{2})O_2 + 2Z - O^- + Z^+ \quad (2)$$

$$\Delta H_{ads} = R\left(\frac{d \ln P}{d(1/T)}\right)_n \quad (3)$$

$$\phi_T = -(\phi_D - \phi_R) - \phi_P - \phi_{FD} - \phi_{FQ} - \phi_{\lambda\lambda} \quad (4)$$

$$\phi_T = (\phi_D - \phi_R) - \phi_P - \phi_{PQ} \quad (5)$$

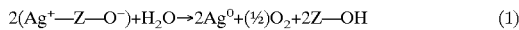

$$\text{product purity} = \frac{\text{(amount of } O2 \text{ from steps II and III)}}{\text{(amount of } N2 \text{ and } O2 \text{ from steps II and III)}} \quad (6)$$

product recovery = (7)

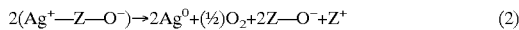

$$\frac{(O2 \text{ from steps II and III}) - (O2 \text{ used in step V})}{(O2 \text{ fed in step I and step II})}$$

$$\text{product throughput} = \frac{\text{(amount of } O2 \text{ produced per hour (kg/hr))}}{\text{(amount of adsorbent used in the bed (kg))}} \quad (8)$$

$$q_k^* = \frac{q_{mk} b_k p_k}{1 + \sum_{j=1}^m b_j p_j} \quad k = 1, 2 \quad (9)$$

$$q_m = k_1 \exp(k_2/T) \text{ and } b = k_3 \exp(k_4/T) \quad (10)$$

The examples above demonstrate new methods for separating nitrogen from a mixture, and more specifically for accomplishing nitrogen separation from an air mixture using new and improved adsorbents. The zeolites of the invention, as demonstrated above, are lithium-based zeolites with silver cation or copper cation present at at least some of the exchangeable cationic sites. The presence of the exchanged cation at any of the sites demonstrated improved performance for adsorption over the non-exchanged zeolites. Without wishing to be held to any particular theory, it is believed that the lithium-based silver and copper exchanged zeolites of the invention achieve selective adsorption of nitrogen enhanced by weak chemical interaction through a type of pi-complexation bond. The effectiveness is clearly demonstrated in the above examples using the Ag$^+$ cation and the same results are obtainable with the Cu$^+$ cation. The Ag$^+$ ion and Cu$^+$ ion have the same electronic structure. That is, in the outer shell orbitals, the s-orbital (5s for Ag and 4s for Cu) is empty, whereas the d-orbitals (4d for Ag and 3d for Cu) are filled (with 10 electrons). This unique electronic structure is the reason that they can form the pi-complexation bonds with molecules that contain pi-electrons, such as olefins. For example, Ag$^+$ and Cu$^+$ have the same adsorption properties for olefins. Furthermore, Ag$^+$ in the AgX zeolite can also form pi-complexation with nitrogen (N$_2$) molecules because N$_2$ has a triple bond. Based on these two observations, it is evident that CuX zeolite forms pi-complexation with N$_2$ molecules.

As mentioned above, the X-zeolite unit cell can be represented by (AlO$_2$)$_{96}$(SiO$_2$)$_{96}$. There are 96 charges to each unit cell. The X zeolites, usable for the from Si/Al ratio of about 1 to about 1.3. In one aspect the LSX zeolite having Si/Al ratio of about one, is preferred. In one aspect, the unit cell contains the preferred Li and Ag$^+$ or Cu$^+$ ions and has the formula Li$_x$M$^{+1}_y$ (AlO$_2$)$_{96}$(SiO$_2$)$_{96}$ where M$^{+1}$ is selected from Ag$^+$ and Cu$^+$ and mixtures thereof. In one preferred embodiment, the adsorbent is represented by this formula, Li$_x$M$^{+1}_y$(AlO$_2$)$_{96}$(SiO$_2$)$_{96}$, where y is in a range of about 0.5 to about 10 and x(Li) is 96-y. However, the invention is not limited to Si/Al=1. As stated earlier, the ratio of Si/Al may range from about 1 to about 1.3, with good results using such Ag$^+$ and Cu$^+$ substituted lithium-based zeolites.

As stated earlier, some amount of other alkali metal (A$^+$) and alkaline metal (Z$^{+2}$) may also be included, as represented by the formula Li$_x$M$^{+1}_y$Z$^{+2}_a$A$^{+1}_b$(AlO$_2$)$_{96}$(SiO$_2$)$_{96}$. Here, the total positive charge for the cations Li, M, Z and A is 96; x+y+2a+b=96. The atomic portion of M is desirably less than 20, and preferably less than or equal to 10; and the portion of Li is desirably greater than 70 and preferably greater than 80. The atomic portion of cationic sites occupied by other metals (Z. A) is less than that occupied by Li. In any case, the largest number of cationic sites is occupied by Li; then after Li, by Ag or Cu, and by Z and/or A, if any.

While this invention has been described in terms of certain embodiments thereof, it is not intended that it be limited to the above description.

What is claimed is:

1. A composition comprising lithium (Li) and metal (M) cation exchanged zeolite wherein said cation exchanged zeolite is selected from the group consisting of Li$_x$M$_y$X zeolite, Li$_x$M$_y$LSX zeolite, wherein said metal (M) cation is silver having a valence state of +1, wherein the metal cation is in the form of dispersed clusters, further wherein x is greater than y, the sum of x+y is less than or equal to the number of cation sites of said zeolite, and y is grater than zero, and wherein the metal cation is presented in an atomic amount corresponding to up to about 20% of the cation sites, wherein the composition is cation exchanged sodium zeolite, wherein sodium is present in an atomic amount less than said silver.

2. The composition of claim 1 wherein the total number of cation sites is 96, lithium is present in an atomic amount greater than 70 and less than 96 atomic units, silver is present in an atomic amount greater than 0 and up to about 20 atomic units, and sodium is present in an atomic amount less than silver.

3. The composition of claim 1 wherein said clusters consist of partially metallic silver.

4. The composition of claim 3 wherein said clusters consist of n atoms of metal (M) collectively having a charge represented by the value n−1.

5. The composition of claims 4 wherein said clusters consist of 3 atoms of metal (M) collectively having a +2 charge, or 6 atoms of metal (M) collectively having a +5 charge.

6. The composition of claim 1 wherein the total number of said cation sites is 96, and y is up to 20.

7. The composition of claim 1 wherein the total number of said cation sites is 96 and y is up to 10.

8. A composition comprising lithium (Li) and metal (M) cation exchanged zeolite wherein said cation exchanged zeolite is selected from the group consisting of $Li_xM_yX$ zeolite, $Li_xM_yLSX$ zeolite, wherein said metal (M) cation is copper and has a valence state of +1, wherein the metal cation is in the form of dispersed clusters, further wherein x is greater than y, the sum of x+y is less than or equal to the number of cation sites of said zeolite, and y is greater than zero, wherein the metal cation is presented in an atomic amount corresponding to up to about 20% of the cation sites, and wherein the composition is adapted to selectively adsorb a compound at about ambient room temperature conditions.

9. The composition of claim 8 wherein the total number of said cation sites is 96, and y is up to 20.

10. The composition of claim 8 wherein the total number of said cation sites is 96 and y is up to 10.

11. The composition of claim 8 wherein said clusters consist of partially metallic copper.

12. The composition of claim 11 wherein said clusters consist of n atoms of metal (M) collectively having a charge represented by the value n−1.

13. The composition of claim 11 wherein said clusters consist of 3 atoms of metal (M) collectively having a +2 charge, or 6 atoms of metal (M) collectively having a +5 charge.

14. The composition of claim 8 which is cation exchanged sodium zeolite where sodium is present in an atomic amount less than said copper.

15. The composition of claim 14 wherein the total number of cation sites is 96, lithium is present in an atomic amount greater than 70 and less than 96 atomic units, copper is present in an atomic amount greater than 0 and up to about 20 atomic units, and sodium is present in an atomic amount less than copper.

16. A process for preparing a composition comprising lithium and metal (M) cation exchanged zeolite where M is in the form of dispersed clusters associated with a plurality of said cation exchanged sites, said method comprising the steps of:

a. providing a sodium zeolite selected from the group consisting of Na-X zeolite and Na-LSX zeolite;

b. exchanging a plurality of $Na^{1+}$ ions with $Li^{1+}$ ions;

c. exchanging a portion of said $Li^{1+}$ ions with $M^{1+}$ ions, wherein the $M^{1+}$ is presented in an atomic amount corresponding to up to about 10% of the cation sites;

d. heat treating the $M^{1+}$ exchanged zeolite of step (c) at a temperature of greater than about 400° C. in a non-oxidizing atmosphere to reduce a portion of said $M^{1+}$ ions to $M^0$, thereby forming said dispersed clusters;

wherein the composition is adapted to selectively adsorb a compound at about ambient room temperature conditions;

and wherein $M^{1+}$ is $Cu^{+1}$ and step (c) is conducted by first exchanging $Li^{1+}$ ions with $Cu^{2+}$ ions and then reducing said $Cu^{2+}$ ions to $Cu^{1+}$ ions.

17. The process of claim 16 wherein in step (d) the non-oxidizing atmosphere is an inert atmosphere or a vacuum.

* * * * *